(12) United States Patent
Wang et al.

(10) Patent No.: US 11,334,817 B2
(45) Date of Patent: May 17, 2022

(54) BLOCKCHAIN-BASED DATA PROCESSING METHOD, APPARATUS, AND ELECTRONIC DEVICE THEREOF

(71) Applicant: Lenovo (Beijing) Co., Ltd., Beijing (CN)

(72) Inventors: Qigang Wang, Beijing (CN); Xiaobing Guo, Beijing (CN); Zhongchao Shi, Beijing (CN); Zeyu Ning, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 540 days.

(21) Appl. No.: 16/295,862

(22) Filed: Mar. 7, 2019

(65) Prior Publication Data
US 2019/0279107 A1 Sep. 12, 2019

(30) Foreign Application Priority Data

Mar. 9, 2018 (CN) .......................... 201810194194.1

(51) Int. Cl.
*G06N 20/00* (2019.01)
*G06F 16/27* (2019.01)
*G06F 9/50* (2006.01)
*G06F 9/54* (2006.01)

(52) U.S. Cl.
CPC .......... *G06N 20/00* (2019.01); *G06F 9/5027* (2013.01); *G06F 9/542* (2013.01); *G06F 16/27* (2019.01)

(58) Field of Classification Search
None
See application file for complete search history.

(56) References Cited

U.S. PATENT DOCUMENTS

| | | | | |
|---|---|---|---|---|
| 10,121,025 | B1* | 11/2018 | Rice | G06F 21/10 |
| 2015/0186779 | A1* | 7/2015 | Deng | G06N 5/027 |
| | | | | 706/47 |
| 2019/0206091 | A1* | 7/2019 | Weng | H04N 19/90 |
| 2019/0238316 | A1* | 8/2019 | Padmanabhan | H04L 9/3297 |

OTHER PUBLICATIONS

A. Besir Kurtulmus et al., "Trustless Machine Learning Contracts; Evaluating and Exchanging Machine Learning Models on the Ethereum Blockchain," Feb. 27, 2018, Cornell University, pp. 1-11, retrieved from https://arxiv.org/pdf/1802.10185.pdf on Jul. 28, 2021. (Year: 2018).*

* cited by examiner

*Primary Examiner* — Chat C Do
*Assistant Examiner* — William C Wood
(74) *Attorney, Agent, or Firm* — Anova Law Group, PLLC (57) ABSTRACT

The present disclosure provides a blockchain-based data processing method, device, and an electronic device thereof. The method includes the steps of acquiring a first block in a blockchain at a current node; broadcasting a first transaction to other nodes in the blockchain, wherein data related to the first transaction includes a model parameter; and creating a second block based on the model parameter and adding the second block into the blockchain in response to two or more second transactions corresponding to the first transaction, wherein data related to the second transactions include voting results corresponding to the first transaction.

16 Claims, 6 Drawing Sheets

BLOCKCHAIN-BASED DATA PROCESSING METHOD, APPARATUS, AND ELECTRONIC DEVICE THEREOF

CROSS-REFERENCES TO RELATED APPLICATIONS

This application claims the priority to Chinese Patent Application No. 201810194194.1, entitled "Blockchain-Based Data Processing Method, Apparatus, and Electronic Device Thereof," filed on Mar. 9, 2018, the entire content of which is incorporated herein by reference.

FIELD OF TECHNOLOGY

The present disclosure relates to the field of data processing. More specifically, the present disclosure relates to a blockchain-based data processing method, apparatus, and an electronic device thereof.

BACKGROUND

Deep learning has led to the third wave of artificial intelligence in human history and has proven to be effective in many areas such as computer vision, voice processing, and language processing. Many commercial artificial intelligence products and services are already available on the market to improve people's lives. With the development of artificial intelligence, the training of artificial intelligence models is an important topic in the field of artificial intelligence research, and more and more researches are being devoted to this topic.

BRIEF SUMMARY OF THE DISCLOSURE

Embodiments of the present disclosure provide a method, apparatus, and an electronic device for processing data based on blockchain to improve the training of artificial intelligence models.

One aspect of the present disclosure provides a blockchain-based data processing method. The method includes the steps of acquiring a first block in a blockchain at a current node, data related to the first block including a first model parameter; acquiring a second model parameter corresponding to a local data set and the first model parameter; broadcasting a first transaction to other nodes in the blockchain, the data related to the first transaction including the second model parameter; and creating a second block based on the second model parameter and adding the second block into the blockchain in response to two or more second transactions corresponding to the first transaction satisfying a predetermined condition, data related to the second transactions including voting results corresponding to the first transaction.

In some embodiments, the second transactions include performing a model accuracy test based on the second model parameter, obtaining the voting results corresponding to the first transaction, and broadcasting to other nodes in the blockchain or returning only to the current node by a node that received the first transaction.

In some embodiments, data related to the first transaction further includes a model definition, and the second transaction includes performing the model accuracy test based on the second model parameter and the model definition, obtaining the voting result and a feedback parameter corresponding to the first transaction, and broadcasting to other nodes in the blockchain system or returning only to the current node by a node that received the first transaction, the voting result corresponding to the second model parameter and the feedback parameter corresponds to the model definition.

In some embodiments, the voting result includes a positive result or a negative result, and the method further comprising updating a local training parameter based on the feedback parameter in response to the voting result being a negative result, and performing a local training on the model based on the updated local training parameter to obtain an updated local model parameter.

In some embodiments, the method further includes: receiving a third transaction, data related to the third transaction including a third model parameter corresponding to the data set of a node transmitting the third transaction; the third transaction including performing a model accuracy test based on the third model parameter to obtain the voting result corresponding to the third transaction; and broadcasting a fourth transaction to other nodes in the blockchain or returning the fourth transaction only to the node that transmitted the third transaction, the fourth transaction including the voting result corresponding to the third transaction.

In some embodiments, the data related to the third transaction includes a model definition and the third model parameter corresponding to a data set of the node transmitting the third transaction. The method further includes performing a model accuracy test based on the third model parameter and the model definition, and obtaining the voting result and a feedback parameter corresponding to the third transaction; and broadcasting the fourth transaction to other nodes in the blockchain or returning only to the node transmitting the third transaction, data related to the fourth transaction including the voting result and the feedback parameter corresponding to the third transaction, the voting result corresponding to the third model parameter, and the feedback parameter corresponding to the model definition.

In some embodiments, the method includes updating a local training parameter based on the third model parameter in the third transaction; and performing a local training to a model based on the updated local training parameter to obtain an updated local model parameter in response to receiving two or more second transactions not satisfying a predetermined condition.

Another aspect of the present disclosure provides a blockchain-based data processing device. The device includes a processor that is configured to acquire a first block in the blockchain, where the first block includes a first model parameter; a processing module configured to acquire a second model parameter corresponding to a local data set and the first model parameter; a broadcasting module configured to broadcast a first transaction to other nodes in the blockchain system, where the first transaction includes a second model parameter; and to create a second block based on the second model parameter and adding the second block to the blockchain in response to two or more second transactions corresponding to the first transaction satisfying a predetermined condition. The second transaction includes a voting result corresponding to the first transaction.

Another aspect of the present disclosure provides a blockchain-based data processing device. The device includes a processor that is configured to receive a first transaction, where data related to the first transaction includes a second model parameter corresponding to a local data set of a node transmitting the first transaction; a first testing module configured to perform a model accuracy test based on the second model parameter to obtain a voting result corresponding to the first transaction; and to broadcast to other nodes in the blockchain or returning only to the node that transmitted the first transaction a second transaction, where data related to the second transaction including the voting result corresponding to the first transaction. In particular, data related to the second transaction include voting results corresponding to the first transaction.

The embodiments of the blockchain-based data processing method, device, and the electronic device thereof provided in the present disclosure may allow each node in the same blockchain system to jointly train a model for the same problem while maintaining the privacy of its data set. Each node may be trained based on the currently optimal model, so each node does not have to waste time to perform the training that other nodes have completed, which can greatly save resources and improve the efficiency of training.

BRIEF DESCRIPTION OF THE DRAWINGS

For a more complete understanding of the present disclosure, and the advantages thereof, reference is now made to the following descriptions to be taken in conjunction with the accompanying drawings. The accompanying drawings in the following description show merely some embodiments of the present invention, and a person of ordinary skill in the art may still derive other drawings from these accompanying drawings without creative efforts.

DETAILED DESCRIPTION

Hereinafter, aspects, features, and embodiments of the present disclosure will be described with reference to the accompanying drawings. It should be understood that such description is exemplary only but is not intended to limit the scope of the present disclosure. In addition, it will be understood by those skilled in the art that various modifications in form and details may be made therein without departing from the spirit and scope of the present disclosure.

Features and aspects of the present disclosure will become apparent with reference to the accompanying drawings and non-limiting examples describing various preferred embodiments of the present disclosure.

It will also be appreciated that although the present disclosure has been described with reference to some specific examples, equivalents of the present disclosure can be achieved by those skilled in the art. These equivalents having features claimed in the present disclosure should fall within the scope of protection defined hereinafter.

Hereinafter, embodiments of the present disclosure will be described with reference to the accompanying drawings. It should be understood that such description is exemplary only but is not intended to limit the scope of the present disclosure. In addition, in the following description, descriptions of well-known structures and techniques are omitted to avoid unnecessarily obscuring the concepts of the present disclosure. Therefore, specific structural and functional details disclosed herein are not intended to be limiting, but are merely used as a basis of the claims to teach those skilled in the art to use the present disclosure in various combinations.

The terms used herein is for the purpose of describing particular embodiments only but is not intended to limit the present disclosure. The words "a", "an" and "the" as used herein should also cover the meanings of "a plurality of" and "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

The phrases "in an embodiment", "in another embodiment", "in another embodiment", or "in other embodiments" may refer to the same or different embodiments accordingly to the present disclosure.

The accompanying drawings illustrating embodiments of the present disclosure along with the summary of disclosure provided above and the detailed description provided below serve to explain the concepts of the present disclosure.

A blockchain is a distributed database of data blocks that are linked in chronological order by hash pointers. These blocks contain all the transactions that have been executed and shared in the community. Each transaction in the blockchain is verified by consensus rules by all or most of the nodes in the community. The following are some of the concepts in the blockchain:

Asset: items that can be owned or controlled to produce value;

Transaction: transfer of assets;

Block: blockchain entry consisting of a set of transactions;

Consensus: all or most of the participants agree on the validity of the second block and the valid block joins the blockchain; and Reward: encouragement provided to the participants for their contribution and honesty.

The training of deep learning models typically consists of the steps of feedforward evaluation, backpropagation, and weight update. In the training process, the feedforward evaluation calculates the model output for each input, the backpropagation calculates the error based on the true value and uses the error to calculate the weight update. After updating the weight, the process is repeated until the entire training data set has been processed. At the end of the training process, a predictive error of the model is calculated based on a validation set. Typically, the training will continue for several cycles, and the training data set will be reprocessed many times until the error of the validation set converges to a desired value, then the trained model is evaluated against the test data.

Artificial intelligence researchers/organizations train artificial intelligence models to solve specific problems. In order to create a working model to address a specific problem, artificial intelligence researchers need to design the model structure, obtain large amounts of data, and spend a lot of computing power to train the model. Further, the training process usually takes a long time (a few hours to several months) to complete.

Moreover, in general, data sets are trade secrets of each organization and will not be shared with others. Therefore, the current practice is that each researcher/organization independently trains its own model based on its own data set. This is not efficient at the social level as resources may be wasted on building the same model.

Since the training process usually takes a long time (for example, several hours to several months), distributed training with multiple nodes may be used to speed up the training process. Distributed training allows multiple copies of the same model to be trained in parallel on different partitions of the training data set, where copies of the model may share a common set of parameters. In particular, to enhance the processing time, each copy of the model may operate in parallel, asynchronously publish model weight updates, and receive updated weight parameters.

Figure 1:
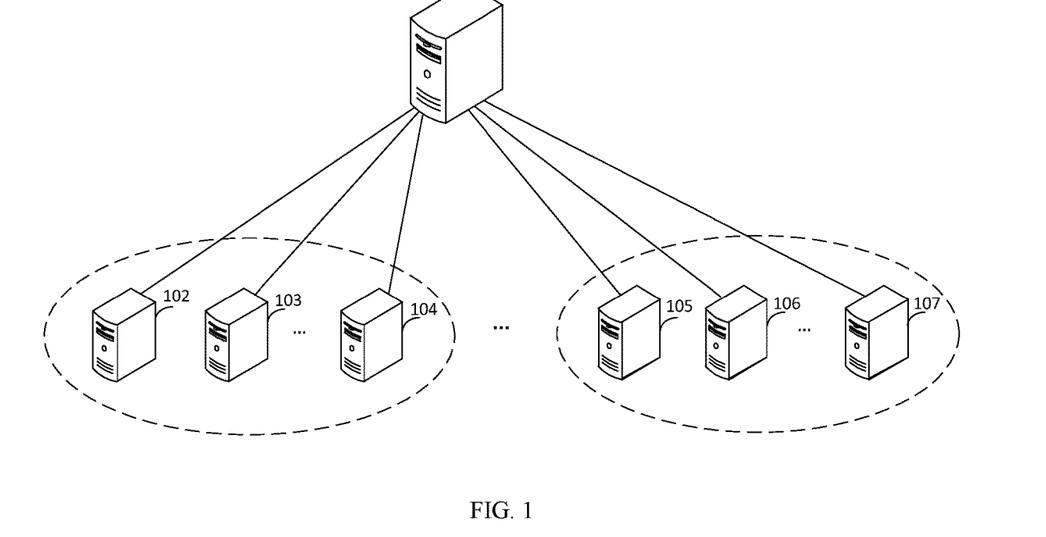
FIG. 1 is a block diagram illustrating an operating environment according to an embodiment of the present disclosure.

FIG. 1 is a block diagram illustrating an operating environment according to an embodiment of the present disclosure. The operating environment may include a plurality of electronic devices (101-107). The electronic devices (101-107) may be a personal computer (PC), a web server, a database server, etc. Each of the electronic devices (101-107) may have the same or different computing powers.

In one embodiment, two or more electronic devices may communicate with each other to form a blockchain system, and each electronic device may act as a node in the blockchain system. Each node in the blockchain system may locally train a model created to address a particular problem with a local data set and collectively generate a shared blockchain for the particular problem.

In another embodiment, one or more electronic devices in the blockchain system may form a community. For example, the community may correspond to a company or a hospital, where each node in the community may be an electronic device in the company or the hospital. Each community in the blockchain system may locally train a model created to address a particular problem with a local data set, and collectively generate a shared blockchain for the particular problem.

Figure 2:
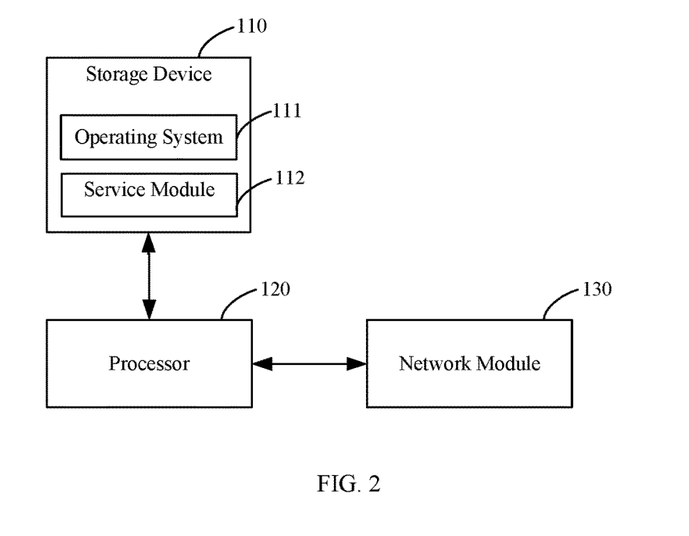
FIG. 2 is a block diagram illustrating the structure of an electronic device according to an embodiment of the present disclosure.

The blockchain-based data processing method provided in the embodiment of the present disclosure may be implemented in the electronic device 100 shown in FIG. 1. As shown in FIG. 2, which is a block diagram illustrating the structure of an electronic device. The electronic device may include a storage device 110, a processor 120, and a network module 130.

The storage device 110 may be used to store computer program instructions and modules, such as the computer program instructions and modules corresponding to the blockchain-based data process method provided in the embodiment of the present disclosure. The processor 120 may perform various functions and data processing by executing the computer program instructions and modules stored in the storage device 110, that is, executing the blockchain-based data processing method according to the embodiment of the present disclosure.

Further, the storage device 110 may further include a high speed random access memory, and may also include a non-volatile memory such as one or more magnetic storage devices, flash memory, or other non-volatile solid state memory, etc.

Furthermore, the computer program instructions stored in the storage device 110 may further include an operating system 111, and a service module 112. The operating system 111, for example, may be LINUX, UNIX, WINDOWS, etc., which may include various software components and drivers for managing system tasks (e.g., memory management, storage device control, power management, etc.), and may communicate with various hardware or software to provide an operating environment for other software components. The service module 112 may operate on the basis of the operating system 111, monitor for requests from the network through the network service of the operating system 111, and perform corresponding data processing based on the requests.

The network module 130 may be used to receive and transmit network signals that may be wireless or wired.

It may be understood that the structure shown in FIG. 2 is merely illustrative, and the electronic devices 101-107 may also include more or fewer components than those shown in FIG. 2, or have a different set up than that shown in FIG. 2. The components shown in FIG. 2 may be implemented in hardware, software, or a combination thereof.

The blockchain-based data processing method and apparatus provided in the embodiments of the present disclosure will be described in more detail below with reference to the accompanying drawings.

Figure 3:
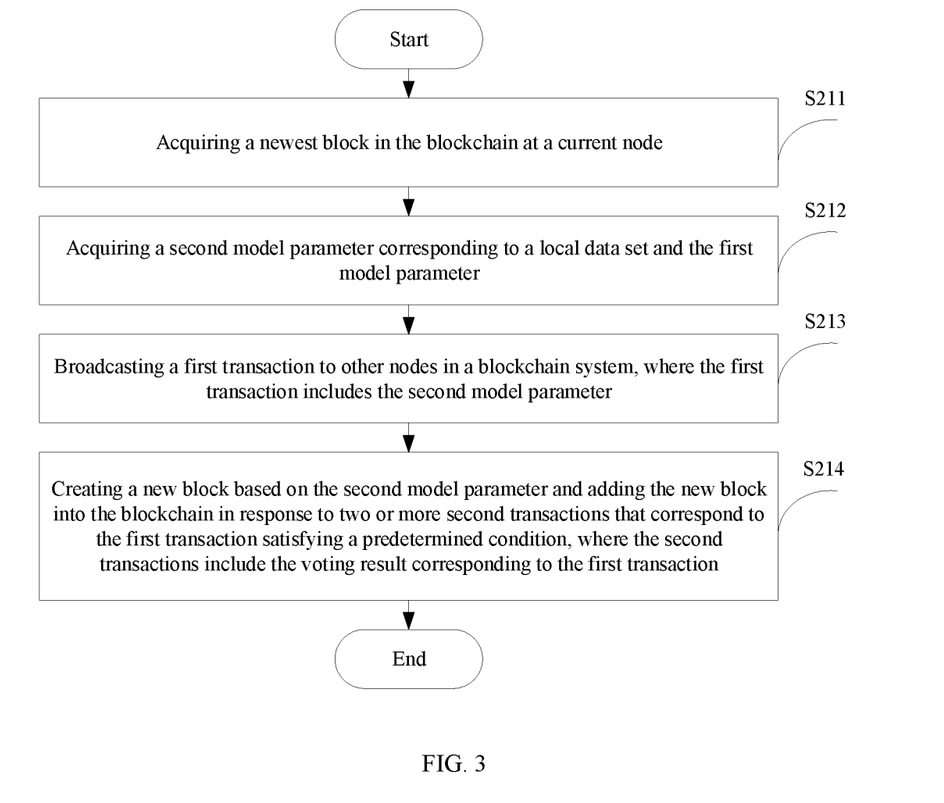
FIG. 3 is a flowchart illustrating a blockchain-based data processing method according to a first aspect of the present disclosure.

FIG. 3 is a flowchart illustrating a blockchain-based data processing method according to a first aspect of the present disclosure. More specifically, the present embodiment describes a processing workflow of an electronic device. The method includes the following steps:

Step S211, acquiring a newest block in the blockchain at a current node.

The current node may be any one of the electronic devices of the operating environment shown in FIG. 1, that is, any one of the nodes 101-107 in FIG. 1.

The blockchain may be a blockchain corresponding to a specific problem that is created and maintained by each node in the blockchain system. When a predetermined condition is met, the nodes in the blockchain system may agree that the current node may create a block and add the block to the blockchain, and the added block may serve as the newest block in the blockchain. At a particular moment, the newest block acquired from the blockchain may be the same for the nodes that are maintaining the blockchain. It can be understood that the blocks of the blockchain are added in chronological order, and the blocks added later may have higher priority than the blocks added earlier.

Figure 4:
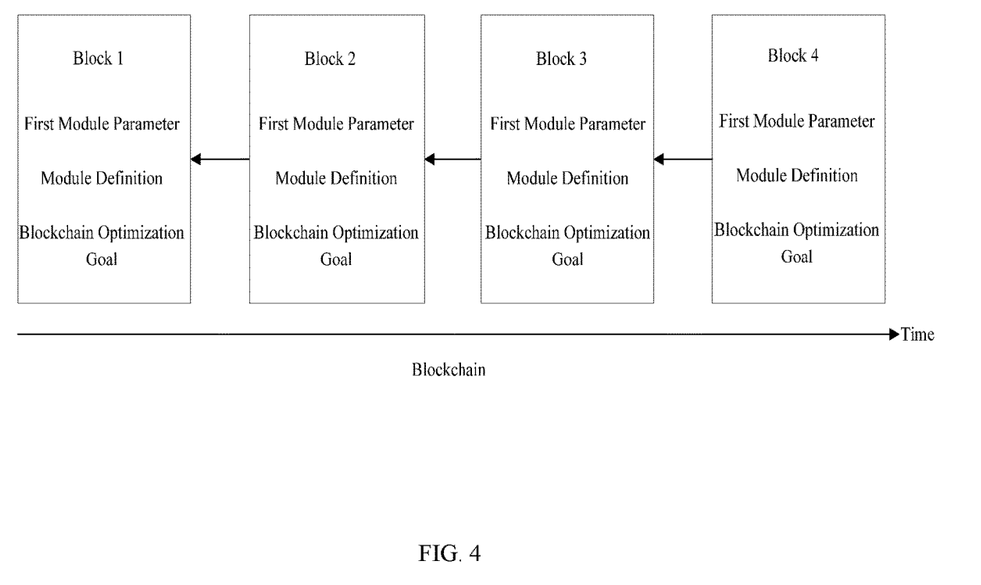
FIG. 4 is a block diagram illustrating a blockchain according to an embodiment of the present disclosure.

FIG. 4 is a block diagram illustrating a blockchain according to an embodiment of the present disclosure.

Each block in the blockchain shown in FIG. 4 may include a first model parameter, a model definition, and a blockchain optimization goal. However, it should be understood that the blocks shown in FIG. 4 are for illustrative purposes only and are not limiting the present disclosure. The structure of the blocks may be different from what is shown in FIG. 4, and other components may be added to or deleted from the blocks. For example, the model definition and the blockchain optimization goal may be maintained locally by each node without being included in the blocks. That is, in one embodiment, only the first model parameter may be included in the blocks.

Referring to FIG. 4, Block 4 is the newest block on the blockchain. That is, the newest block in the blockchain acquired by the current node is Block 4, and the Block 4 may include a first model parameter, a model definition, and a blockchain optimization goal.

Further, the first model parameter may be a weight or a weight gradient. The weight gradient refers to the change of the weight. For example, the weight gradient may be the difference between the newly received weight and the last received weight. For example, the weight gradient may be calculated, based on the following formula:

$\Delta W = W^c - W^c_{prev}$, where $\Delta W$ is the weight gradient, $W^c$ is the newly received weight, and $W^c_{prev}$ is the last received weight.

Referring to FIG. 3, the data processing method may further include Step S212: acquiring a second model parameter corresponding to a local data set and the first model parameter.

When the current node acquires the newest block, the model definition may be acquired from the newest block, and the model may be locally trained and the second model parameter corresponding to the local data set may be acquired based on the model definition, the first model parameter and the local data set. Alternatively, the current node may also adopt the locally maintained model definition that may be the same as the model definition in other nodes of the blockchain system, locally train the model, and acquire the second model parameter corresponding to the local data set based on the model definition, the first model parameter and the local data set.

Further, the second model parameter may be an updated model parameter after the current node has been trained by the model. For example, it may be, but is not limited to, an updated weight or an updated weight gradient.

Referring to FIG. 3, the data processing method may further include Step S213: broadcasting a first transaction to other nodes in the blockchain system, where the first transaction includes the second model parameter.

In one embodiment, if the optimization goal is limited to the model parameter in the current model, the current node may broadcast the first transaction that includes the second model parameter to other nodes in the blockchain system. When the other nodes in the blockchain system receive the first transaction, a model accuracy test may be performed based on the second model parameter, and a voting result corresponding to the first transaction may be obtained and broadcasted to other nodes in the blockchain system. Or, a second transaction with data that include the voting result corresponding to the first transaction may be returned to the current node.

In one embodiment, the voting result may include a positive result or a negative result. More specifically, the positive result may be represented by, but is not limited to, a +V or 1, and the negative result may be represented by, but is not limited to, a −V or 0.

Referring to FIG. 3, the data processing method may further include Step S214: creating a new block based on the second model parameter and adding the new block into the blockchain in response to two or more second transactions that correspond to the first transaction satisfying a predetermined condition. The second transactions may include the voting results data corresponding to the first transaction.

When the current node receives two or more second transactions, it is necessary to determine whether the received two or more second transactions satisfy the predetermined condition or not. The predetermined condition may include any one of the following conditions:

(1) The number of second transactions received with positive result in the voting results is identical to the number of nodes in the blockchain system. That is, the second transactions returned by all the nodes in the blockchain system to the current node have positive result in the voting results.

(2) The ratio of the received number of second transactions having positive result in the voting results and the number of nodes in the blockchain system exceeds a predetermined threshold. That is, the second transactions returned by most of the nodes in the blockchain system to the current node have positive result in the voting results. The predetermined threshold may be set based on different requirements and is not limited in the present disclosure.

For example, if a positive result is represented by a +V, and the ratio of the number of the two or more second transactions with the +Vs received and the number of nodes in the blockchain system exceeds the predetermined threshold, it is determined that the received two or more second transactions corresponding to the first transaction have satisfied the predetermined condition.

(3) The ratio of the received number of second transactions with data having positive result in the voting results and the number of nodes in the blockchain system exceeds a predetermined threshold, and the received two or more second transactions with data having positive result in the voting results is from a committee node. That is, the second transactions returned by most of the nodes in the blockchain system to the current node have positive result in the voting results, and these nodes include the committee node.

Further, the committee node may be a specific node in the blockchain system. For example, it may be a node with higher priority. The priority of the node may correspond, but is not limited, to the computing power or the credit rating of the node. In addition, the committee node may be a specific predetermined node, or it may be determined by an election among the nodes in the blockchain system.

Accordingly, each node in the same blockchain system may jointly train a model for the same problem while maintaining the privacy of its data set, and each node may be trained based on the currently optimal model, so each node does not have to waste time to perform the training that other nodes have completed, which can greatly save resources and improve the efficiency of training.

In another embodiment, if the current model needs to be optimized, a current node may broadcast a first transaction with a model definition and a second model parameter corresponding to the model definition to other nodes in the blockchain system. When the other nodes in the blockchain system receive the first transaction, a model accuracy test may be performed based on the second model parameter and the model definition, and a voting result and a feedback parameter in response to the first transaction may be obtained and broadcasted to other nodes in the blockchain system broadcast or returned only to the current node.

Further, the voting result may correspond to the second model parameter to indicate whether other nodes in the blockchain agree with the model definition and the second model parameter in the second transaction or not. If they agree, then the voting result may be a positive result, if they do not agree, then the voting result may be a negative result.

Furthermore, the feedback parameter may correspond to the model definition. If other nodes in the blockchain do not agree with the model definition or the second model parameter in the second transaction sent by the current node, a feedback result may be sent to the current node to help the current node optimize the second model parameters or the model definition in the second transaction.

Accordingly, the model may be further optimized using distributed training and feedback from other nodes in the blockchain system, and the efficiency of the training model of the current node may also be improved.

Figure 5:
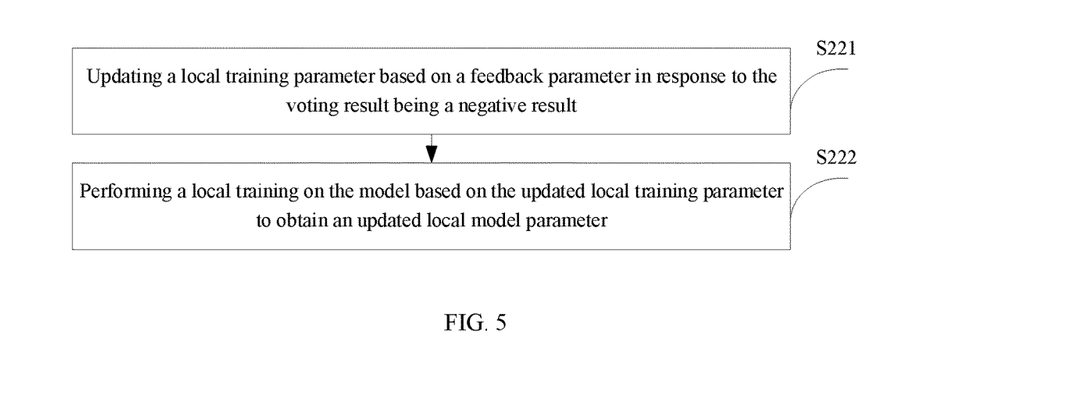
FIG. 5 is a flowchart illustrating a part of the blockchain-based data processing method according to the first aspect of the present disclosure.

FIG. 5 is a flowchart illustrating a part of the blockchain-based data processing method according to the first aspect of the present disclosure. The method may include the following steps:

Step S221, updating a local training parameter based on a feedback parameter in response to the voting result is a negative result.

Step S222, performing a local training on the model based on the updated local training parameter to obtain an updated local model parameter.

Accordingly, the nodes in the blockchain may cooperate with each other, and the feedback from other nodes in the blockchain help to reduce the resources of the current node and accelerate the training time and efficiency of the current node model.

Figure 6:
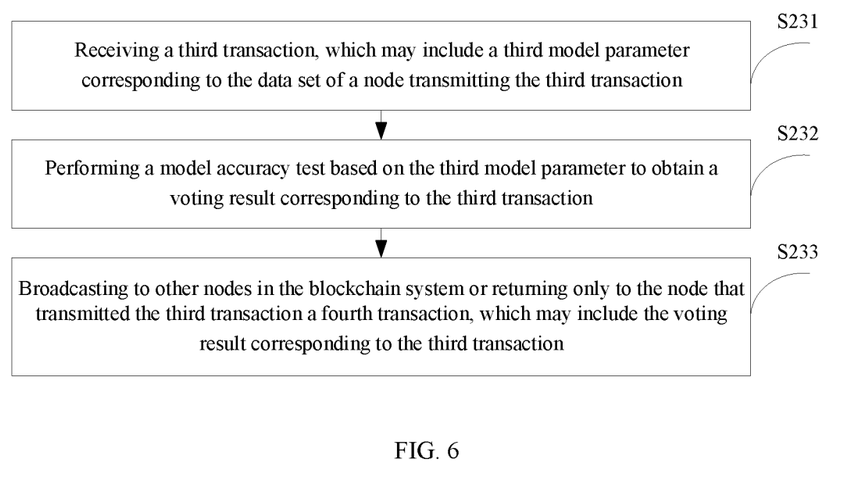
FIG. 6 is a flowchart illustrating another part of the blockchain-based data processing method according to the first aspect of the present disclosure.

In another embodiment, not only the current node may mine the block, but it can also help the other nodes in the blockchain to verify the block. FIG. 6 is a flowchart illustrating another part of the blockchain-based data processing method according to the first aspect of the present disclosure. The method may include the following steps:

Step S231, receiving a third transaction, which may include data of a third model parameter corresponding to the data set of a node transmitting the third transaction.

The third transaction may be transmitted by any node in the blockchain system other than the current node. The node that transmits the third transaction may acquire the first block on the blockchain, obtain the third model parameter corresponding to the local data set of the node that transmits the third transaction based on the first model parameter and the local data set from the node that transmits the third transaction, and transmit the third transaction to the current node.

Step S232, performing a model accuracy test based on the third model parameter to obtain a voting result corresponding to the third transaction.

In one embodiment, the current block may also include a blockchain optimization goal, and the accuracy test of the model may include determining whether the model satisfies the blockchain optimization goal or not; if the goal is satisfied, the voting result may be a positive result; if the goal is not satisfied, then the voting result may be a negative result.

Further, the blockchain optimization goal may further include an optimization goal and a constraint, that is, determining whether the model satisfies the optimization goal under the constraint or not. For example, the optimization goal may be the minimal loss, and the constraint may be that the model size does not exceed, for example, 200 MB.

Step S233, broadcasting to other nodes in the blockchain system or returning only to the node that transmitted the third transaction a fourth transaction, which may include the data of the voting result corresponding the third transaction.

Figure 7:
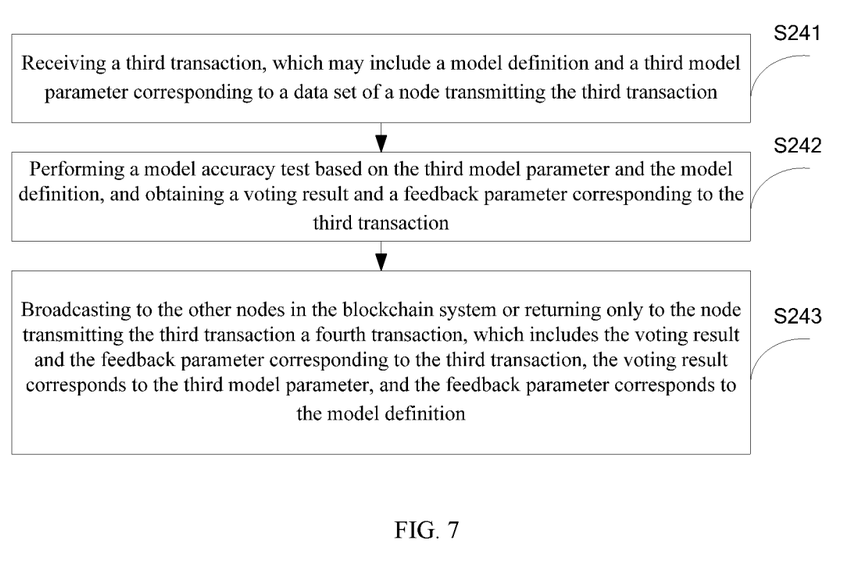
FIG. 7 is a flowchart illustrating yet another part of the blockchain-based data processing method according to the first aspect of the present disclosure.

FIG. 7 is a flowchart illustrating yet another part of the blockchain-based data processing method according to the first aspect of the present disclosure. In one embodiment, if the other nodes in the blockchain system other than the current node need to request the current node to verify the mined model definition and the third model parameters, the method may include the following steps:

Step S241, receiving a third transaction, which may include data of a model definition and a third model parameter corresponding to a data set of a node transmitting the third transaction;

Step 242, performing a model accuracy test based on the third model parameter and the model definition, and obtaining a voting result and a feedback parameter corresponding to the third transaction;

Step 243, broadcasting to the other nodes in the blockchain system or returning only to the node transmitting the third transaction a fourth transaction, which may include the voting result and the feedback parameter corresponding to the third transaction, where the voting result may correspond to the third model parameter, and the feedback parameter may correspond to the model definition.

The implementation of Step S241 to Step S243 is similar to Step S231 to Step S233 and will not be repeated again herein.

Accordingly, the nodes in the blockchain may be used not only as the mining nodes, but also serve as the verification nodes. The resources of each node may be fully utilized, and the resource utilization of the entire blockchain system may also be improved.

Figure 8:
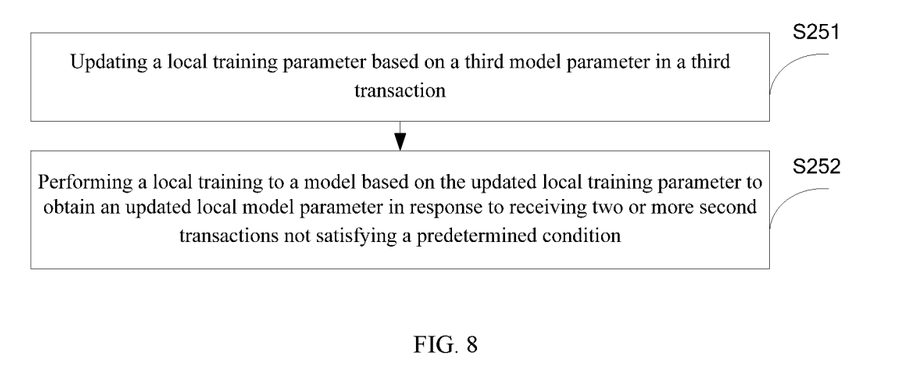
FIG. 8 is a flowchart illustrating still another part of the block chain-based data processing method according to the first aspect of the present disclosure.

FIG. 8 is a flowchart illustrating still another part of the block chain-based data processing method according to the first aspect of the present disclosure. The method may include the following steps:

Step S251, updating a local training parameter based on a third model parameter in a third transaction.

More specifically, if the current node receives the third model parameter transmitted by other nodes in the blockchain system, the third model parameter may be used to update the local training parameter.

Step S252, performing a local training to the model based on the updated local training parameter to obtain an updated local model parameter in response to receiving two or more second transactions not satisfying a predetermined condition.

More specifically, in response to receiving two or more second transactions not satisfying the predetermined condition, that is, the model parameter that the current node is mining has not been agreed by the other nodes in the blockchain system, the current node may perform the local training to the model based on the local training parameter.

Accordingly, the current node may perform further training based on the training results of other nodes, instead of continuing training based on the results of the local training, so that the training efficiency of the current node may be improved, and the training time may be reduced.

In one embodiment, to encourage the nodes in the blockchain to actively optimize the model definition and the model parameter, the method may further include using a fifth transaction to assign one or more rewards to the node that created the new block, the node that generated the first transaction, and the node that transmitted the second transaction after the new block is added to the blockchain.

Further, the method may further include assigning a corresponding reward to a node when the node first joins the blockchain system.

In one embodiment, when the newest block on the blockchain for a particular problem has reached the optimization goal available for commercial operations, the method may further include allocating resources in each node based on the number of rewards corresponding to each node in the blockchain system to further encourage nodes in the blockchain to actively optimize the model definition and the model parameter.

The embodiment of the blockchain-based data processing method provided in the present disclosure may allow each node in the same blockchain system to jointly train a model for the same problem while maintaining the privacy of its data set, and each node may be trained based on the currently optimal model, so each node does not have to waste time to perform the training that other nodes have completed, which can greatly save resources and improve the efficiency of training. Further, the nodes in the blockchain may cooperate with each other, and the feedback from other nodes in the blockchain help to reduce the resources of the current node and accelerate the training time and efficiency of the current node model. Furthermore, the nodes in the blockchain may be used not only as the mining nodes, but also serve as the verification node. The resources of each node may be fully utilized, and the resource utilization of the entire blockchain system may also be improved.

Figure 9:
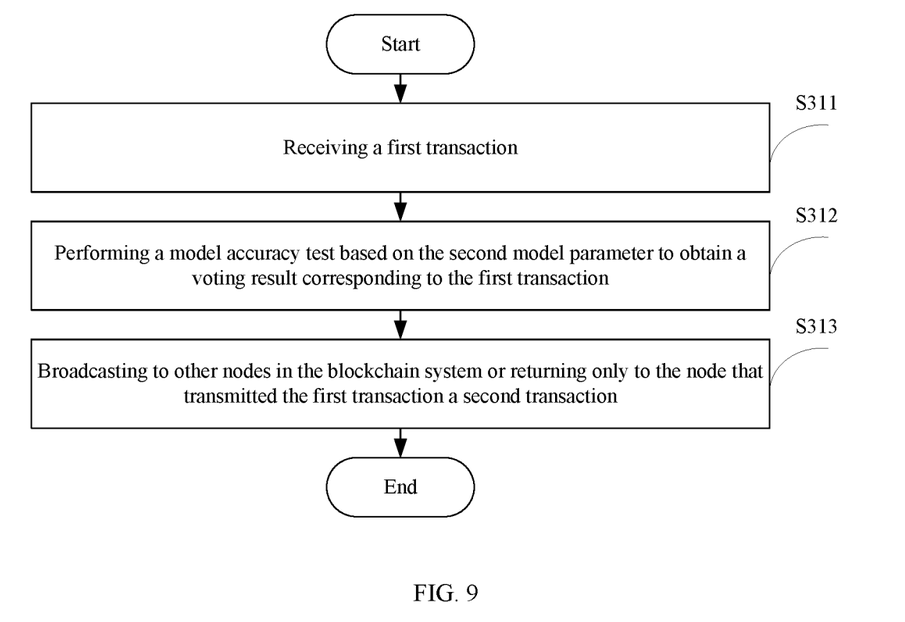
FIG. 9 is a flowchart illustrating a blockchain-based data processing method according to a second aspect of the present disclosure.

FIG. 9 is a flowchart illustrating a blockchain-based data processing method according to a second aspect of the present disclosure. The method may include the following steps:

Step S311, receiving a first transaction, which may include a second model parameter corresponding to a local data set of the node transmitting the first transaction.

Step S312, performing a model accuracy test based on the second model parameter to obtain a voting result corresponding to the first transaction.

Step S313, broadcasting to other nodes in the blockchain system or returning only to the node that transmitted the first transaction a second transaction, which may include the voting result corresponding to the first transaction.

Further, the second model parameter is the newest block in the blockchain acquired by the node that transmitted the first transaction acquires, the newest block may include the first model parameter, which may be obtained based on the first model parameter and the local data set.

The implementation of Step S311 to Step S313 is similar to Step S231 to Step S233 and will not be repeated again herein.

The embodiment of the blockchain-based data processing method provided in the present disclosure may allow electronic devices to be used only as a verification node without performing the mining work, which allows the electronic devices with less available resources to be fully utilized in the blockchain system. Of course, it can be understood that the mining work provided in the first embodiment may also be executed by the electronic devices.

Figure 10:
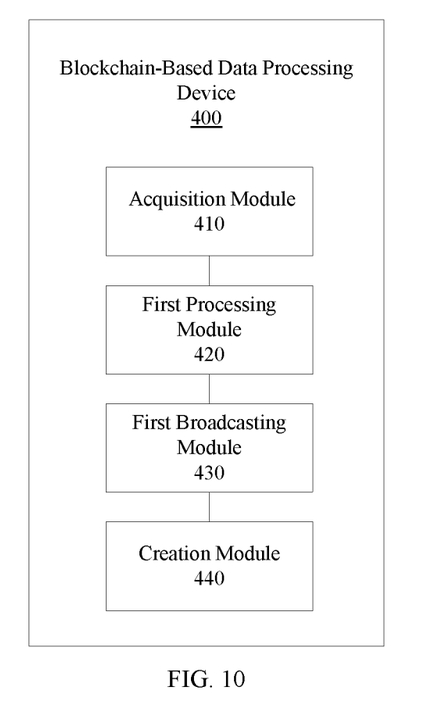
FIG. 10 is a functional block diagram illustrating a blockchain-based data processing device according to a third aspect of the present disclosure.

FIG. 10 is a functional block diagram illustrating a blockchain-based data processing device 400 according to a third aspect of the present disclosure. The blockchain-based data processing device 400 may include an acquisition module 410, a first processing module 420, a first broadcasting module 430, and a creation module 440.

The acquisition module 410 may be used to acquire a newest block in the blockchain, and the newest block may include a first model parameter.

The first processing module 420 may be used to acquire a second model parameter corresponding to a local data set and the first model parameter.

The first broadcasting module 430 may be used to broadcast a first transaction to other nodes in the blockchain system, and the first transaction may include a second model parameter.

In one embodiment, the first transaction may further include a model definition. Further, the node that received the first transaction may perform a model accuracy test based on the second model parameter and the model definition to obtain a voting result and a feedback parameter corresponding to the first transaction, and broadcast to other nodes in the blockchain system or return only to the current node a second transaction. Furthermore, the voting result may correspond to the second model parameter and the feedback parameter may correspond to the model definition.

The creation module 440 may be used to create a new block based on the second model parameter and add the new block to the blockchain in response to two or more second transactions corresponding to the first transaction satisfying a predetermined condition. Further, the second transaction may include the voting result corresponding to the first transaction.

Further, the second transaction may be broadcasted to other nodes in the blockchain system or returned only to the current node by the node received the first transaction after performing the model accuracy test and obtaining the voting result corresponding to the first transaction.

In one embodiment, the predetermined condition may include any one of the following conditions: the number of second transactions received with positive result in the voting results is identical to the number of nodes in the blockchain system; the ratio of the received number of second transactions with data having positive result in the voting results and the number of nodes in the blockchain system exceeds a predetermined threshold; or the ratio of the received number of second transactions with data having positive result in the voting results and the number of nodes in the blockchain system exceeds a predetermined threshold, and the received two or more second transactions with data having positive result in the voting results is from a committee node.

In one embodiment, the voting result may include a positive result and a negative result. Further, the data processing device may further include a first updating module for updating a local training parameter based on the feedback parameter in response to the voting result is a negative result and performing a local training on the model based on the updated local training parameter to obtain an updated local model parameter.

In one embodiment, the data processing device may further include a second receiving module, a second testing module, and a second transmitting module. The second receiving module may be used to receive a third transaction, which may include a third model parameter corresponding to a data set of the node that transmitted the third transaction. The second testing module may be used to perform the model accuracy test based on the third model parameter to obtain the voting result corresponding to the third transaction. The second transmitting module may be used to broadcast to other nodes in the blockchain system or return only to the current node a fourth transaction, which may include the voting result corresponding to the third transaction.

In one embodiment, the fourth transaction may have data include the voting result and the feedback parameter corresponding to the third transaction. Further, the voting result may correspond to the third model parameter and the feedback parameter may correspond to the model definition.

In another embodiment, the data processing device may further include a second updating module for updating a local training parameter based on the third model parameter in the third transaction and performing a local training to the model based on the updated local training parameter to obtain an updated local model parameter in response to receiving two or more second transactions not satisfying a predetermined condition.

In another embodiment, the first block may include a blockchain optimization goal, and the second testing module may be used to determine whether the model satisfies the blockchain optimization goal or not. If the goal is satisfied, the voting result may be a positive result; if the goal is not satisfied, then the voting result may be a negative result.

In another embodiment, the data processing device may further include a first rewarding module for assigning one or more rewards to the node that created the new block, the node that generated the first transaction, and the node that transmitted the second transaction after the new block is added to the blockchain through using a fifth transaction.

In another embodiment, the data processing device may further include a second rewarding module for assigning a corresponding reward to a node when the node first joins the blockchain system.

In another embodiment, the data processing device may further include an allocating module for allocating resources in each node based on the number of rewards corresponding to each node in the blockchain system.

The embodiment of the blockchain-based data processing device provided in the present disclosure may allow each node in the same blockchain system to jointly train a model for the same problem while maintaining the privacy of its data set, and each node may be trained based on the currently optimal model, so each node does not have to waste time to perform the training that other nodes have completed, which can greatly save resources and improve the efficiency of training. Further, the nodes in the blockchain may cooperate with each other, and the feedback from other nodes in the blockchain help to reduce the resources of the current node and accelerate the training time and efficiency of the current node model. Furthermore, the nodes in the blockchain may be used not only as the mining nodes, but also serve as the verification nodes. The resources of each node may be fully utilized, and the resource utilization of the entire blockchain system may also be improved.

The modules set forth above may be implemented by computer program instructions, and may also be implemented by hardware such as an integrated circuit chip.

Figure 11:
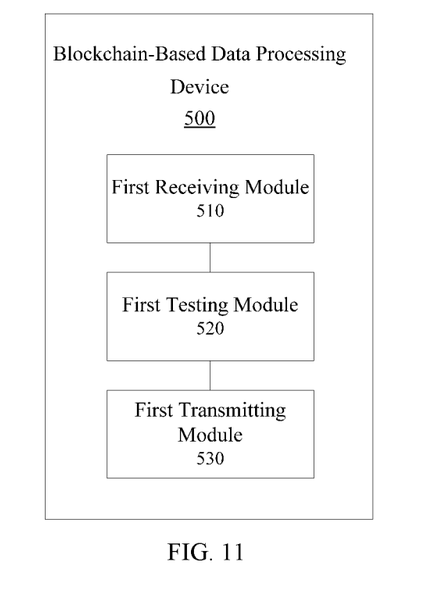
FIG. 11 is a functional block diagram illustrating a blockchain-based data processing device according to a fourth aspect of the present disclosure.

FIG. 11 is a functional block diagram illustrating a blockchain-based data processing device 500 according to a fourth aspect of the present disclosure. The blockchain-based data processing device 500 may include a first receiving module 510, a first testing module 520, and a first transmitting module 530.

The first receiving module 510 may be used to receive a first transaction, which may include a second model parameter corresponding to a local data set of the node transmitting the first transaction.

The first testing module 520 may be used to perform a model accuracy test based on the second model parameter to obtain a voting result corresponding to the first transaction.

The first transmitting module 530 may be used to broadcast to other nodes in the blockchain system or return only to the node that transmitted the first transaction a second transaction, which may include the voting result corresponding to the first transaction.

Further, the second model parameter is the newest block in the blockchain acquired by the node that transmitted the first transaction, and the newest block may include a first model parameter, which may be obtained based on the first model parameter and the local data set.

The embodiment of the blockchain-based data processing device provided in the present disclosure may allow electronic devices to be used only as a verification node without performing the mining work, which allows the electronic devices with less available resources to be fully utilized in the blockchain system. Of course, it can be understood that the mining work provided in the first embodiment may also be executed by the electronic devices.

The modules set forth above may be implemented by computer program instructions, and may also be implemented by hardware such as an integrated circuit chip.

A fifth aspect of the present disclosure provides an electronic device. The electronic device may include a storage device and a processor. The storage device may be coupled to the processor, the storage device may store computer program instructions that may be executed by the processor to perform that storing instructions that, when executed by the processor may acquire a newest block in the blockchain on a current node, where the newest block may include a first model parameter; acquire a second model parameter corresponding to a local data set and the first model parameter; broadcast a first transaction to other nodes in the blockchain system, where the first transaction may include the second model parameter; and create a new block based on the second model parameter and add the new block to the blockchain in response to receiving two or more second transactions corresponding to the first transaction satisfying a predetermined condition, where the second transactions' data may include a voting result corresponding to the first transaction.

The embodiment of the electronic device provided in the present disclosure may allow each node in the same blockchain system to jointly train a model for the same problem while maintaining the privacy of its data set, and each node may be trained based on the currently optimal model, so each node does not have to waste time to perform the training that other nodes have completed, which can greatly save resources and improve the efficiency of training.

A sixth aspect of the present disclosure provides an electronic device. The electronic device may include a storage device and a processor. The storage device may be coupled to the processor, the storage device may store computer program instructions that may be executed by the processor to perform that storing instructions that, when executed by the processor may receive a first transaction, which may include a second model parameter corresponding to a local data set of the node transmitting the first transaction; perform a model accuracy test based on the second model parameter to obtain a voting result corresponding to the first transaction; and broadcast to other nodes in the blockchain system or return only to the node that transmitted the first transaction a second transaction, which may include the voting result corresponding to the first transaction.

Further, the second model parameter may be the newest block in the blockchain acquired by the node that transmitted the first transaction, and the newest block may include a first model parameter, which may be obtained based on the first model parameter and the local data set.

Those skilled in the art may clearly understand that, for ease and concision of the descriptions, the aforementioned processing method may be applied to the related electronic devices, and the related details may refer to corresponding descriptions in the disclosed embodiments, which are not repeated herein.

The embodiments in this specification are described in a progressive manner, each embodiment emphasizes a difference from the other embodiments, and the identical or similar parts between the embodiments may be made reference to each other. Since the apparatuses disclosed in the embodiments are corresponding to the methods disclosed in the embodiments, the description of the apparatuses is simple and relevant parts may be made reference to the description of the methods.

Persons skilled in the art may further realize that, units and steps of algorithms according to the description of the embodiments disclosed by the present disclosure can be implemented by electronic hardware, computer software, or a combination of the two. In order to describe interchangeability of hardware and software clearly, compositions and steps of the embodiments are generally described according to functions in the forgoing description. Whether these functions are executed by hardware or software depends upon specific applications and design constraints of the technical solutions. Persons skilled in the art may use different methods for each specific application to implement the described functions, and such implementation should not be construed as a departure from the scope of the present disclosure.

The steps of the methods or algorithms described in the embodiments of the present disclosure may be directly implemented by hardware, software modules executed by the processor, or a combination of both. The software module can be placed in a random access memory (RAM), memory, read only memory (ROM), electrically programmable ROM, electrically erasable and programmable ROM, register, hard disk, mobile disk, CD-ROM, or any other form of storage medium known to the technical domain.

It will be understood by those skilled in the art that the features described in the respective embodiments and/or claims of the present disclosure can be combined in various ways, even if such combinations are not explicitly described in the present disclosure. In particular, without departing from the spirit and teaching of the present disclosure, the features described in the respective embodiments and/or claims can be combined in various ways. All of these combinations fall within the scope of the present disclosure.

While the present disclosure has been shown and described with reference to various embodiments thereof, it will be understood by those skilled in the art that various modifications in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

It should be noted that the description of the foregoing embodiments of the electronic device may be similar to that of the foregoing method embodiments, and the device embodiments have the same beneficial effects as those of the method embodiments. Therefore, details may not be described herein again. For technical details not disclosed in the embodiments of the electronic device of the present disclosure, those skilled in the art may understand according to the method embodiments of the present disclosure.

In the several embodiments provided in the present disclosure, it should be understood that the disclosed device and method may be realized in other manners. The device embodiments described above are merely exemplary. All functional modules or units in the embodiments of the present disclosure may all be integrated in one processing unit, or each unit may be used as a single unit. Two or more units may be integrated in one. The above integrated unit can either be implemented in the form of hardware, or in the form of hardware combined with software functional units.

Persons of ordinary skill in the art should understand that, all or a part of steps of implementing the foregoing method embodiments may be implemented by related hardware of a computer instruction program. The instruction program may be stored in a computer-readable storage medium, and when executed, a processor executes the steps of the above method embodiments as stated above. The foregoing storage medium may include various types of storage media, such as a removable storage device, a read only memory (ROM), a random-access memory (RAM), a magnetic disk, or any media that stores program code.

Alternatively, when the above-mentioned integrated units of the present disclosure are implemented in the form of a software functional module being sold or used as an independent product, the integrated unit may also be stored in a computer-readable storage medium. Based on this understanding, the technical solutions provided by the embodiments of the present disclosure essentially or partially may be embodied in the form of a software product stored in a storage medium. The storage medium stores instructions which are executed by a computer device (which may be a personal computer, a server, a network device, or the like) to realize all or a part of the embodiments of the present disclosure. The above-mentioned storage medium may include various media capable of storing program codes, such as a removable storage device, a read only memory (ROM), a random-access memory (RAM), a magnetic disk, or an optical disk.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

The foregoing descriptions are merely embodiments of the present disclosure, and the protection scope of the present disclosure is not limited thereto. The scope that anyone skilled in the art may easily conceive changes and substitutions within the technical scope disclosed in the present disclosure that should be covered by the present disclosure. Therefore, the protection scope of the present disclosure should be subject to the scope of the claims as listed in the following.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. A blockchain-based data processing method, comprising:
   acquiring a first block in a blockchain at a current node;
   broadcasting a first transaction to other nodes in the blockchain, wherein data related to the first transaction includes a model parameter of a model;
   determining whether two or more second transactions received by the current node satisfy a predetermined condition, data related to the second transactions including voting results corresponding to the first transaction, the predetermined condition including at least one of:
- a number of satisfying second transactions among the two or more second transactions is identical to a number of nodes in the blockchain, each of the satisfying second transactions having a positive result;
- a ratio of the number of the satisfying second transactions and the number of the nodes in the blockchain exceeds a predetermined threshold; or
- the ratio of the number of the satisfying second transactions and the number of the nodes in the blockchain exceeds the predetermined threshold, and each of the satisfying second transactions being from a committee node; and
- creating a second block based on the model parameter and adding the second block into the blockchain in response to the two or more second transactions satisfying the predetermined condition.

2. The method according to claim 1, wherein each of the two or more second transactions is broadcasted by or returned to the current node by one of the other nodes in the blockchain that receives the first transaction after the one of the other nodes include performing a model accuracy test based on the model parameter and obtaining one of the voting results corresponding to the first transaction.

3. The method according to claim 1, wherein:
- the data related to the first transaction further includes a model definition of the model;
- each of the two or more second transactions is broadcasted by or returned to the current node by one of the other nodes in the blockchain that receives the first transaction after the one of the other nodes performing a model accuracy test based on the model parameter and the model definition and obtaining one of the voting results and a feedback parameter corresponding to the first transaction; and
- the voting results correspond to the model parameter and the feedback parameter corresponds to the model definition.

4. The method according to claim 3, further comprising, in response to one of the voting results being a negative result:
- updating a local training parameter based on the feedback parameter corresponding to the negative result; and
- performing a local training on the model based on the updated local training parameter to obtain an updated local model parameter.

5. The method according to claim 1, further comprising:
- receiving a third transaction, data related to the third transaction including an additional model parameter corresponding to a data set of a node that transmits the third transaction;
- performing a model accuracy test based on the additional model parameter to obtain a voting result corresponding to the third transaction; and
- broadcasting a fourth transaction to the other nodes in the blockchain or returning the fourth transaction only to the node that transmitted transmits the third transaction, data related to the fourth transaction including the voting result corresponding to the third transaction.

6. The method according to claim 5, wherein:
- the data related to the third transaction further includes a model definition and the additional model parameter corresponding to the data set of the node that transmits the third transaction;
- performing the model accuracy test includes performing the model accuracy test based on the additional model parameter and the model definition to obtain the voting result corresponding to the third transaction and a feedback parameter corresponding to the third transaction;
- the data related to the fourth transaction further includes the feedback parameter corresponding to the third transaction; and
- the voting result corresponding to the third transaction corresponds to the additional model parameter, and the feedback parameter corresponding to the third transaction corresponds to the model definition.

7. The method according to claim 5, further comprising:
- updating a local training parameter based on the additional model parameter in the third transaction; and
- performing a local training to the model based on the updated local training parameter to obtain an updated local model parameter in response to the two or more second transactions not satisfying the predetermined condition.

8. The method of claim 1, further comprising:
- assigning a reward to at least one of a node that creates a new block, a node that broadcasts the first transaction, or a node that transmits the second transaction.

9. The method of claim 1, further comprising: assigning a reward to a node when the node first joins the blockchain.

10. The method of claim 1, further comprising: allocating resources in each node of the blockchain based on a number of rewards corresponding to the each node of the blockchain.

11. A blockchain-based data processing device, comprising a processor configured:
- to acquire a first block in the blockchain at a current node;
- to broadcast a first transaction to other nodes in the blockchain, wherein the data related to the first transaction include a model parameter;
- to determine whether two or more second transactions received by the current node satisfy a predetermined condition, data related to the second transactions including voting results corresponding to the first transaction, the predetermined condition including at least one of:
  - a number of satisfying second transactions among the two or more second transactions is identical to a number of nodes in the blockchain, each of the satisfying second transactions having a positive result;
  - a ratio of the number of the satisfying second transactions and the number of nodes in the blockchain exceeds a predetermined threshold; or
  - the ratio of the number of the satisfying second transactions and the number of nodes in the blockchain exceeds the predetermined threshold, and each of the satisfying second transactions being from a committee node; and
- to create a second block based on the model parameter and adding the second block to the blockchain in response to the two or more second transactions satisfying the predetermined condition.

12. The device according to claim 11, wherein each of the two or more second transactions is broadcasted by or returned to the current node by one of the other nodes in the blockchain that receives the first transaction after the one of the other nodes performing a model accuracy test based on the model parameter and obtaining one of the voting results corresponding to the first transaction.

13. The device according to claim 11, wherein:

the data related to the first transaction further includes a model definition of the model;

each of the two or more second transactions is broadcasted by or returned to the current node by one of the other nodes in the blockchain that receives the first transaction after the one of the other nodes performing a model accuracy test based on the model parameter and the model definition and obtaining one of the voting results and a feedback parameter corresponding to the first transaction; and the voting results correspond to the model parameter and the feedback parameter corresponds to the model definition.

14. The device according to claim 11, wherein the processor is further configured to, in response to one of the voting results being a negative result:

update a local training parameter based on a feedback parameter corresponding to the negative result; and perform a local training on the model based on the updated local training parameter to obtain an updated local model parameter.

15. The device according to claim 11, wherein the processor is further configured to:

receive a third transaction, data related to the third transaction including an additional model parameter corresponding to a data set of a node that transmits the third transaction;

perform a model accuracy test based on the additional model parameter to obtain a voting result corresponding to the third transaction; and broadcast a fourth transaction to other nodes in the blockchain or return the fourth transaction only to the node that transmits the third transaction, the fourth transaction including the voting result corresponding to the third transaction.

16. The device according to claim 15, wherein:

the data related to third transaction further include a model definition and the additional model parameter corresponding to the data set of the node that transmits the third transaction;

the processor is further configured to perform the model accuracy test based on the additional model parameter and the model definition to obtain the voting result corresponding to the third transaction and a feedback parameter corresponding to the third transaction;

the data related to the fourth transaction further includes the feedback parameter corresponding to the third transaction; and the voting result corresponding to the third transaction corresponds to the additional model parameter, and the feedback parameter corresponding to the third transaction corresponds to the model definition.

* * * * *